United States Patent [19]

Ueno

[11] Patent Number: 4,852,011
[45] Date of Patent: Jul. 25, 1989

[54] APPARATUS FOR CONTROLLING THE SPEED OF AN INTERNAL COMBUSTION ENGINE VEHICLE

[75] Inventor: Masahito Ueno, Higashimatsuyama, Japan

[73] Assignee: Alps Electric Co., Ltd., Japan

[21] Appl. No.: 59,155

[22] Filed: Jun. 5, 1987

Related U.S. Application Data

[63] Continuation of Ser. No. 670,340, Nov. 9, 1984, abandoned.

[30] Foreign Application Priority Data

Nov. 9, 1983 [JP] Japan .................. 58-209118

[51] Int. Cl.$^4$ ............................. B60L 3/00
[52] U.S. Cl. .................. 364/431.07; 123/352; 123/399
[58] Field of Search ............... 123/350, 333, 352, 399

[56] References Cited

U.S. PATENT DOCUMENTS

| | | | |
|---|---|---|---|
| 3,886,915 | 6/1975 | Taplin | 180/179 |
| 4,219,000 | 8/1980 | Locher et al. | 123/333 |
| 4,319,658 | 3/1982 | Collonia et al. | 123/350 |
| 4,408,293 | 10/1983 | Avins | 180/179 |
| 4,419,729 | 12/1983 | Krieder | 180/179 |
| 4,422,420 | 12/1983 | Cromas et al. | 180/179 |
| 4,426,980 | 1/1984 | Eiseles et al. | 123/352 |
| 4,453,516 | 6/1984 | Filsinger | 123/352 |
| 4,474,155 | 10/1984 | Sagues | 123/333 |
| 4,541,052 | 9/1985 | McCulloch | 364/431.07 |

Primary Examiner—Parshotam S. Lall
Assistant Examiner—Ngoc Pham
Attorney, Agent, or Firm—Guy W. Shoup; Paul J. Winters; Brian D. Ogonowsky

[57] ABSTRACT

In a vehicle speed control apparatus for an internal combustion engine vehicle, in which the first amount of fuel supply required for maintaining the vehicle speed at a desired speed and the second amount of fuel supply corresponding to the amount of depression of an accelerator pedal are separately calculated, the apparatus comprises a selector for selecting the larger of the first and second amount of fuel supply to control the fuel adjusting member, and a modifying circuit for modifying the output data showing the first amount of fuel supply to cause it to slowly change, taking into account the value of the second data showing the second amount of fuel supply just before the second amount of fuel supply becomes smaller than the first amount of fuel supply, whereby the vehicle speed is prevented from being rapidly decelerated when the mode of vehicle speed control is changed from that by the second data to that by the first data. With this arrangement, a sudden change in the control data can be prevented and the vehicle speed can be prevented from suddenly changing at the time of changing over between vehicle speed control carried out by the accelerator pedal and that by the automatic vehicle speed controlling device, to obtain smooth control of the vehicle speed.

7 Claims, 5 Drawing Sheets

APPARATUS FOR CONTROLLING THE SPEED OF AN INTERNAL COMBUSTION ENGINE VEHICLE

This is a continuation application from application Ser. No. 670,340 filed Nov. 9, 1984, now abandoned.

BACKGROUND OF THE INVENTION

1. Field of the Invention

The present invention relates to an apparatus for controlling the speed of an internal combustion engine vehicle, and more particularly to a vehicle speed control apparatus for an internal combustion engine vehicle in which switching between a manual vehicle speed controlling mode and an automatic vehicle speed controlling mode by means of an automatic vehicle speed controlling device can be smoothly carried out.

2. Description of the Prior Art

Automatic vehicle speed controlling devices have been widely used for the purpose of automatically maintaining the speed of vehicles driven by internal combustion engines, such as diesel engines, gasoline engines and the like at a desired speed. In the internal combustion engine vehicle equipped with such an automatic vehicle speed controlling device, the desired amount of fuel supply corresponding to the amount of depression of an accelerator pedal and the amount of fuel supply required for maintaining the vehicle speed at a desired speed are separately calculated. Then, the larger of the two amounts of fuel supply is selected aand the engine speed is controlled in accordance with control data showing the selected amount of fuel supply.

Therefore, in the conventional automatic vehicle speed controlling device when, for example, the accelerator pedal is deeply depressed at a time when the amount of fuel supply calculated in accordance with the degree of depression of the acceleration pedal is smaller than that calculated by the automatic vehicle speed controlling device because the accelerator pedal has been in the released condition up to that time, the amount of fuel supply calculated in accordance with the degree of the depression of the accelerator pedal increases beyond the amount of fuel supply calculated by the automatic vehicle speed controlling device, so that the vehicle speed is controlled in accordance with the degree of depression of the accelerator pedal.

In addition, in the conventional automatic vehicle speed controlling device, when the vehicle speed controlling state is switched to the mode of control by operation of the accelerator pedal, the amount of fuel supply calculated by the automatic vehicle speed controlling device becomes zero and control of vehicle speed by the automatic vehicle speed controlling device is discontinued until, for example, a predetermined switch is depressed. Such an automatic vehicle speed controlling device is disclosed in, for example, U.S. Pat. No. 4,337,511.

In such a device, the amount of the fuel supply calculated by the automatic vehicle speed controlling device returns to the previous value, when the predetermined switch is depressed after the vehicle speed control mode is changed from control by the automatic vehicle speed controlling device to that by the accelerator pedal, and the accelerator pedal is released. Therefore, especially when the accelerator pedal is released suddenly, there is the disadvantage that the vehicle rapidly decelerates for a moment just after changing to the automatic vehicle speed control mode so that the vehicle does not travel smoothly. This condition will occur in a vehicle driven by any kind of internal combustion engine.

SUMMARY OF THE INVENTION

It is an object of the present invention to provide an improved apparatus for controlling the speed of an internal combustion engine vehicle.

It is an object of the present invention to provide an apparatus for controlling the speed of an internal combustion engine vehicle, which can prevent a rapid change in the state of vehicle speed control at the time of switching over between vehicle speed control carried out by the operation of the accelerator pedal and that carried out by an automatic vehicle speed controlling device, thereby realizing smooth vehicle speed control.

According to the present invention, in a vehicle speed control apparatus for a vehicle powered by an internal combustion engine, the apparatus comprises a first detecting means for producing a vehicle speed signal indicating the actual vehicle speed at each instant, a first calculating means responsive to at least the vehicle speed signal for calculating a first data indicating a first amount of fuel supply required for maintaining the vehicle speed at a desired value, a second calculating means responsive to the operation of an accelerator pedal for calculating a second data indicating a second amount of fuel supply required for controlling the vehicle speed in accordance with the amount of operation of the accelerator pedal, a selecting means responsive to the first and second data for selecting the larger of the first and second data as control data, a comprising means responsive to the first and second data for comparing the first amount of fuel supply with the second amount of fuel supply, and a modifying means responsive to the result of the comparison by the comparing means for modifying the output data from the first calculating means to cause it to slowly change, taking into account the value of the second data just before the second amount of fuel supply becomes smaller than the first amount of the fuel supply, whereby the vehicle speed is prevented from being rapidly decelerated when the mode of vehicle speed control is changed from that by the second data to that by the first data.

With the arrangement described above, when the mode of vehicle speed control once switched over from that by the automatic vehicle speed controlling device to that in response to the operation of the accelerator pedal returns to the mode controlled by the automatic vehicle speed controlling device, and the accelerator pedal is thereafter released, the value of the firt data is gradually lowered from the value of the second data just before the accelerator pedal is released to the value showing the amount of fuel supply necessary for the keeping the desired constant speed of the vehicle.

As a result, a sudden change in the control data can be prevented and the vehicle speed can be prevented from suddenly changing at the time of changing over between vehicle speed control carried out by the accelerator pedal and that by the automatic vehicle speed controlling device, to obtain smooth control of the vehicle speed.

The invention will be better understood and the other objects and advantages thereof will be more apparent from the following detailed description of a preferred embodiment with reference to the accompanying drawings.

DESCRIPTION OF THE PREFERRED EMBODIMENTS

Figure 1:
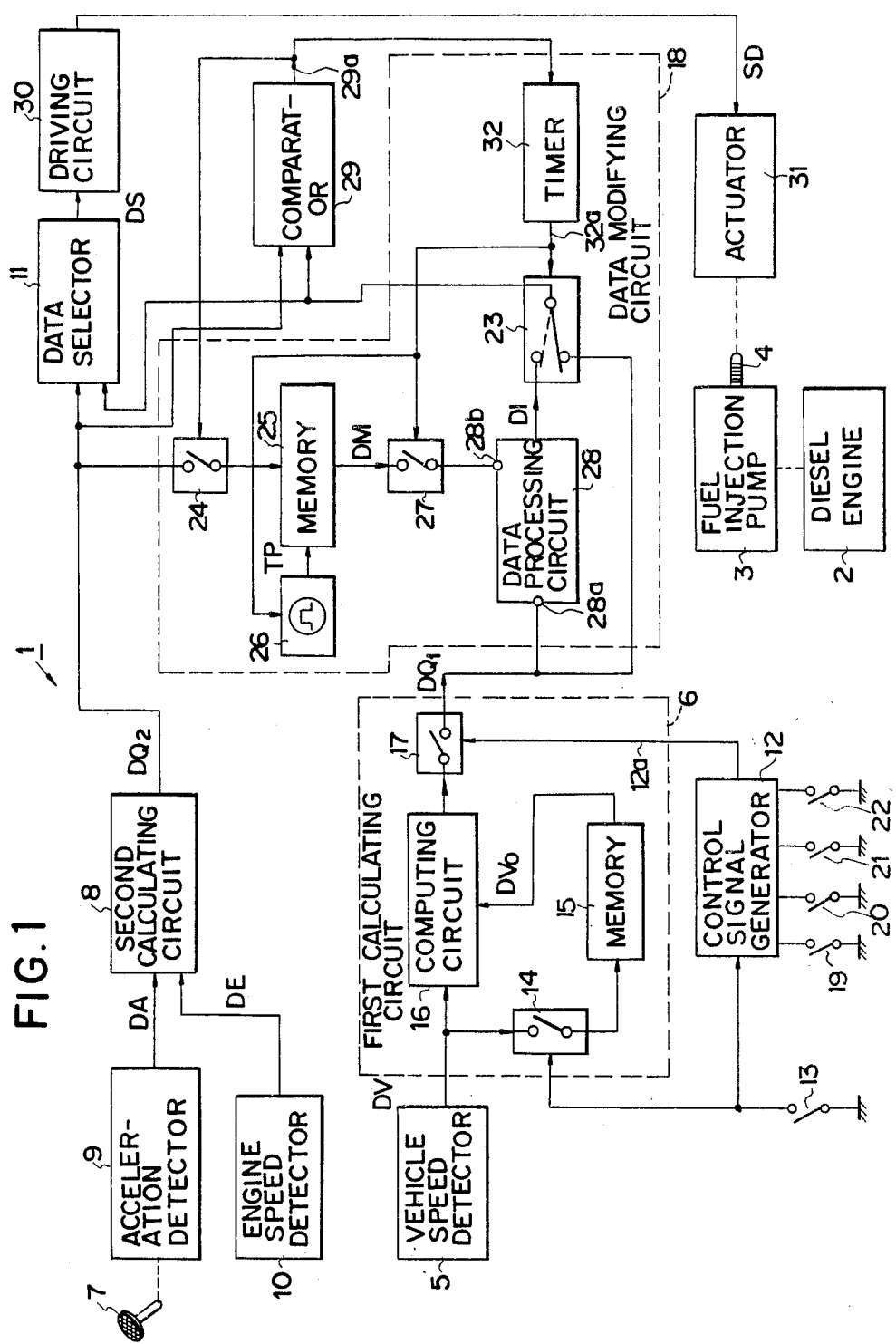
FIG. 1 is a block diagram of an embodiment of a vehicle speed controlling system in accordance with the present invention for use in a vehicle driven by a diesel engine.

FIG. 1 shows a block diagram of an embodiment of a vehicle speed controlling system in accordance with the present invention as applied to a vehicle driven by a diesel engine. The vehicle speed controlling apparatus denoted by reference numeral 1 controls the speed of a vehicle (not shown) driven by a diesel engine 2 by regulating the position of a control rack 4 of a fuel injection pump 3 for supplying fuel to the diesel engine 2. The vehicle speed controlling apparatus 1 has a first calculating circuit 6 for calculating a first data $DQ_1$ showing a first amount of fuel supply $Q_1$ necessary for maintaining the vehicle speed at a desired target speed in response to vehicle speed data DV which is produced by a vehicle speed detector 5 and is indicative of the vehicle speed at each instant, and a second calculating circuit 8 for calculating a second data $DQ_2$ showing a second amount of fuel supply $Q_2$ necessary for controlling the vehicle speed in accordance with the amount of operation of an accelerator pedal 7 at each instant.

The accelerator pedal 7 is connected with an acceleration detector 9 which produces acceleration data DA showing the amount of depression of the accelerator pedal 7. Acceleration data DA and an engine speed signal DE produced by an engine speed detector 10 and indicative of the speed of the diesel engine 2 are applied to the second calculating circuit 8, in which the second amount of the fuel supply $Q_2$ required for controlling the vehicle speed in accordance with the amount of operation of the accelerator pedal 7 at each instant is calculated. Data showing the calculated result is produced as the second data $DQ_2$ and is applied to a data selector 11.

The first calculating circuit 6, in cooperation with a control signal generator 12, constitutes a so-called cruise control device which controls the vehicle speed to maintain it at the desired level. The first calculating circuit 6 has a normaly closed type switch 14 which is closed when a set switch 13 is ON and a memory 15 connected through the switch 14 with the vehicle speed detector 5. Vehicle speed data DV at the time the once closed switch 14 is opened is stored as target vehicle speed data $DV_0$ in the memory 15, and the target vehicle speed data $DV_0$ stored in the memory 15 is applied to a computing circuit 16 to which vehicle speed data DV is input. The first amount of fuel supply $Q_1$ necessary for maintaining the actual vehicle speed at the target vehicle speed indicated by target vehicle speed data $DV_0$ is calculated by the computing circuit 16 and data showing the calculated result is produced as the first data $DQ_1$ which is applied through a switch 17 to a data modifying circuit 18.

The switch 17 is arranged to close when the level of an output line 12a is high and to open when the level thereof is low. In addition to the set switch 13, a resume switch 19, a brake switch 20 which is turned ON when a brake pedal (not shown) is depressed, a clutch switch 21 which is turned ON when the vehicle clutch is disengaged and a neutral switch 22 which is turned ON when the vehicle transmission is shifted into neutral position are connected to the control signal generator 12. The control signal generator 12 changes the level of the output line 12a from low to high when the set switch 13 is turned ON and latches the high-level state. The control signal generator 12 releases the latched high-level state of the output line 12a when at least one of switches 20, 21 and 22 is turned ON and holds the low-level state of the output line 12a. Furthermore, the control signal generator 12 has a function of changing the level of the output line 12a from low to high and holding its high-level state when the switch 19 is closed after the high-level state of the output line 12a is released as described above. A control signal generator having such functions is known in the prior art.

As a result of this arrangement, the switch 17 is closed when the set switch 13 or the resume switch 19 has operated, and the first data $DQ_1$ is applied to the data modifying circuit 18. On the other hand, when any one of the switches 20 to 22 is turned ON to open the switch 17, the first data $DQ_1$ is prevented from being applied to the data modifying circuit 18.

The data modifying circuit 18 has a memory 25 to which the second data $DQ_2$ is applied through a normally open type switch 24 and clock pulses TP from a clock pulse generator 26 are applied as read-in timing pulses for the memory 25. Consequently, when the switch 24 is closed as described hereinafter, the second data $DQ_2$ is read into the memory 25 at predetermined intervals in response to the output of the clock pulses TP. Data DM read from the memory 25 is applied through a switch 27 to an input terminal 28b of a data processing circuit 28, to another input terminal 28a of which the first data $DQ_1$ is applied.

The data processing circuit 28 is a circuit for processing the data applied to the input terminal 28a in such a way that the value of output data DI is gradually changed at a predetermined rate from the value of the data applied to the input terminal 28b at that time to the value of the data applied to the input terminal 28a. This data processing may be carried out in the analog form or in the digital form, or be carried out by the use of a microcomputer.

Figure 4:
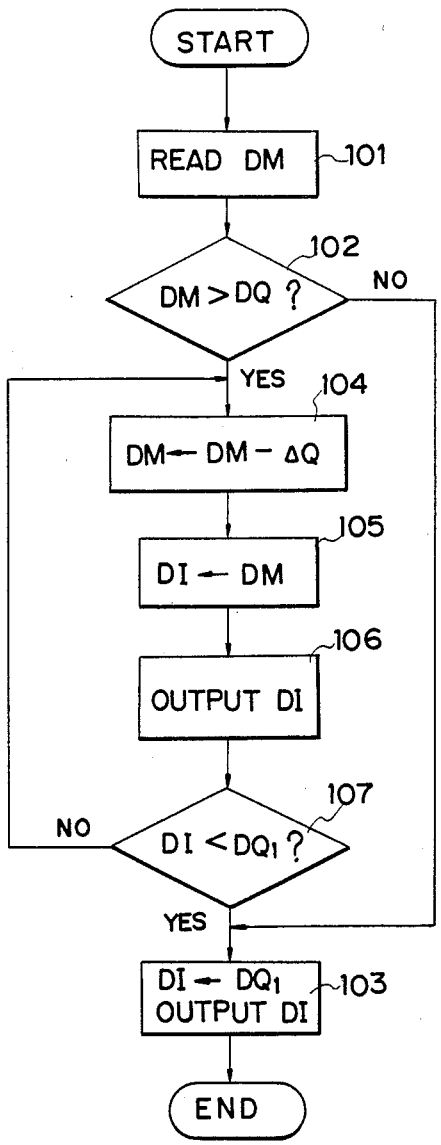
FIG. 4 is a flow chart of a program to be executed by a microcomputer used as the data modifying circuit of the vehicle speed controlling system of FIG. 1.

FIG. 4 shows the flow chart of a program executed when a microcomputer is used for the data processing circuit 28. Execution of the program starts in response to the closing of the switch 27 to apply data MD to the input terminal 28b. Data DM is first read in in step 101, whereafter it is discriminated whether or not data DM is larger than first data $DQ_1$ in step 102. Step 103 is executed when the discriminated result in step 102 is NO, whereby the content of data DI is replaced by first data $DQ_1$ and data DI is output. Then, the execution of the program is terminated.

When the discriminated result in step 102 is YES, the computation for gradually changing data DM to data $DQ_1$ at that time is executed in the following steps. Namely, the content of data DM is replaced by the result obtained by subtracting a predetermined value $\Delta Q$ from data DM in step 104, and the replaced data DM is output as output data DI (steps 105 and 106). Then, it is discriminated whether or not output data DI is less than first data $DQ_1$ (step 107) and steps 104 to 106 are executed repetitively until data DI is less than first data $DQ_1$. When data DI becomes less than $DQ_1$, the content of output data DI is replaced by first data $DQ_1$ (step 103), and then the execution of the program is terminated.

As a result, after the switch 27 is closed, output data DI is gradually decreased from data DM at the time the switch 27 is closed until it reaches the value of first data $DQ_1$.

Output data DI is provided to one fixed contact of the selecting switch 23, and first data DQ1 is provided to the other fixed contact as shown in FIG. 1, so that the first data $DQ_1$ is derived from the selecting switch 23 when the selecting switch 23 is switched over as shown by the solid line in FIG. 1 and is supplied to the data selector 11 and a comparator 29. On the other hand, when the selecting switch 23 is switched over as shown by the broken line of FIG. 1, output data DI is derived from the selecting switch 23 and is supplied to the data selector 11 and the comparator 29.

The data selector 11 is a circuit for selecting and outputting the larger of the two input data. The data selected by the data selector 11 is derived as output data DS and the output data DS is applied to a driving circuit 30, in which the position of the control rack 4 necessary for obtaining the amount of fuel injected shown by output data DS is computed and produces a driving signal SD to be supplied to an actuator 31 in order to position the control rack 4 at the computed position. The driving signal SD is applied to an actuator 31 which is connected to the control rack 4 for actuating the control rack 4.

On the other hand, the comparator 29 compares the magnitude of the two input data, and the level of the output line 29a of the comparator 29 is changed from low to high when the second data $DQ_2$ becomes more than the data from the data modifying circuit 18. When the second data $DQ_2$ becomes equal to or les than the data from the data modifying circuit 18, the level of the output line 29a is changed from high to low.

The output line 29a is connected to the switch 24, which is closed when the level of the output line 29a becomes high to provide the second data $DQ_2$ to the memory 25. The output line 29a is also connected to a timer 32 which is triggered to start operation when the level of the output line 29a is changed from high to low. Then, the level of the output line 32a becomes high during a predetermined time period $T_0$. The output line 32a of the timer 32 is connected to the switches 23 and 27. The switch 23 is switched over as shown by the solid line of FIG. 1 when the level of the output line 32a is low, while the switch 23 is switched over as shown by the broken line of FIG. 1 when the level of the output line 32a is high. That is, the switch 23 is switched over to the state as shown by the broken line of FIG. 1 during the time period $T_0$ when the level of the output line 29 a is changed from high to low. The output line 32a is also connected to the clock pulse generator 26 which is arranged so as to stop the outputting of the clock pulses TP only when the level of the output line 32a is high.

The operation of the apparatus shown in FIG. 1 will now be described hereinafter with reference to FIGS. 2 and 3.

Description is made of the operation from before automatic vehicle speed control is initiated from time $t_1$. Assume that the accelerator pedal 7 is released and the first data $DQ_1$ necessary for automatically controlling the vehicle speed is produced by the first calculating circuit 6 to automatically control the vehicle speed and maintain it at the target speed indicated by the target vehicle speed data $DV_0$. In this case, the first data $DQ_1$ is larger than the second data $DQ_2$ since the amount $Q_1$ is larger than $Q_2$, and the level of the output line 29a of the comparator 29 is low, so that the switch 24 is OFF. Since the output line 32a of the timer 32 is at low level at this time, the switch 27 is OFF and the switch 23 is switched over as shown by the solid line of FIG. 1. Therefore, the first data $DQ_1$ from the first calculating circuit 6 is derived through the switch 23 and is applied to the data selector 11 and the comparator 29.

Since the amount $Q_1$ is larger than the amount $Q_2$ as described above, the first data $DQ_1$ is selected as output data DS by the data selector 11 and output data DS is applied to the driving circuit 30. Consequently, the vehicle speed is controlled in accordance with the first data $DQ_1$ and the adjustment of the amount of fuel injected is performed in order to maintain the vehicle speed at the desired target speed.

When the accelerator pedal 7 is depressed at $t_1$, the second amount of fuel supply $Q_2$ increases in proportion to the amount of depression of the accelerator pedal 7. As a result, the value of the second data $DQ_2$ increases and the second data $DQ_2$ is selected instead of the output of data modifying circuit 18 by the data selector 11 when the second data $DQ_2$ becomes more than the first data $DQ_1$ at time $t_2$. As a result, the value of the first data $DQ_1$ decreases after time $t_2$, while the value of the output data DS changes to the value of the second data $DQ_2$.

When the second data $DQ_2$ becomes larger than the first data $DQ_1$ at time $t_2$, since the comparator 29 also operates and the level of the output line 29a becomes high, the switch 24 is closed. The clock pulses TP are being output since the level of the output line 32a is low at this time, so that the second data $DQ_2$ at each instant is read and stored in the memory 25 at predetermined intervals in response to the clock pulses TP.

Therefore, when the vehicle speed control is changed from the automatic mode to the manual mode, the data stored in the memory 25 is up-dated at predetermined intervals to the value of the second data $DQ_2$ at that instant.

When the depressed accelerator pedal 7 is released at time $t_4$, the second data $DQ_2$ rapidly decreases and becomes zero. As a result, the level of the output line 29a of the comparator 29 is changed from high to low when the first data $DQ_1$ exceeds the second data $DQ_2$ derived from the switch 23, so that the switch 24 is closed to stop the derivation of the clock pulses TP. Therefore, it follows that the value X of the second data $DQ_2$ stored in memory 25 just before the level of the output line 29a of the comparator 29 changed from high to low is maintained therein and the timer 32 is triggered at the same time. As a result, the switch 27 is closed by a predetermined time period $T_0$ and the switch 23 is switched over as shown by the broken line in FIG. 1 by the period $T_0$. Since the first calculating circuit 6 calculates the amount of fuel supply necessary for carrying out the vehicle speed control in accordance with the target vehicle speed data stored in the memory 5 and produces the first data $DQ_1$ indicating the calculated result at this time, the value of the first data $DQ_1$ rapidly increases after time $t_4$ and returns to the value Y which is the value before time $t_2$. As a result, the first data $DQ_1$, namely Y, and data DM, namely X, are input into the data processing circuit 28. The data DI derived from the data processing circuit 28 is decreased from value X to value Y at a predetermined rate after time $t_4$.

That is, even when the second data $DQ_2$ becomes approximately zero at time $t_4$ and the first data $DQ_1$ returns from approximately zero to the previous value Y, the operation of the data processing circuit 28 assures that data DI, whose value gradually decreases from X toward Y, is supplied to the driving circuit 30. Consequently, sudden deceleration of the vehicle is effectively prevented even when the accelerator pedal 7 is suddenly released at time $t_4$.

When the level of the output line 32a of the timer 32 changes from high to low at time $t_6$ after the data DS becomes coincident with the first data $DQ_1$ at time $t_5$, the switch 27 is opened and the switch 23 is switched over as shown by the solid line of FIG. 1. Thus, the first data $DQ_1$ is applied through the data selector 11 the driving circuit 30.

Figure 2:
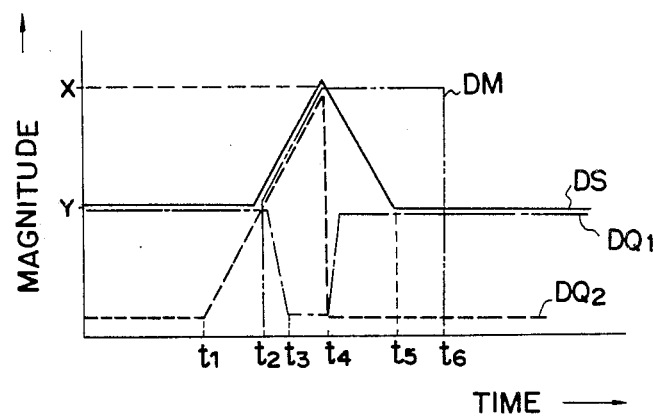
FIG. 2 is a graph showing the relationship among various signals over the course of time during the operation of the vehicle speed controlling system of FIG. 1.
Figure 3:
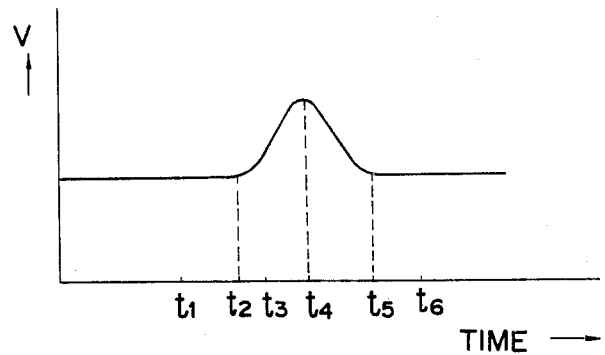
FIG. 3 is a graph showing the change in vehicle speed corresponding to the operation of the vehicle speed controlling system of FIG. 1 as illustrated in FIG. 2.

As a result, the output data DS changes as shown in FIG. 2. Consequently, as shown in FIG. 3, the vehicle speed V is varied in accordance with the change in the output data DS shown in FIG. 2, so that the vehicle speed V is slowly decreased after time $t_4$ to reach the desired speed, without occurrence of sudden deceleration.

Figure 5:
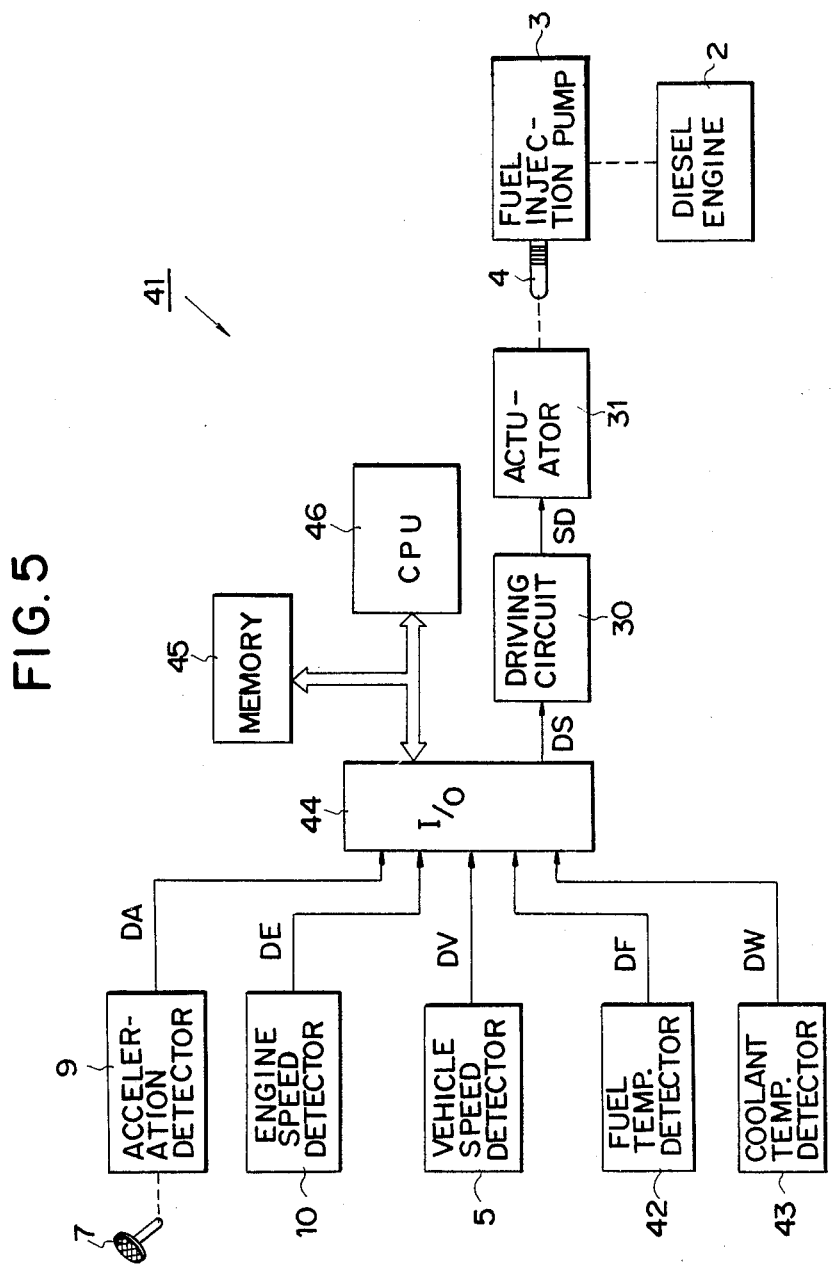
FIG. 5 is a block diagram of a second embodiment of a vehicle speed controlling system in accordance with the present invention.

A vehicle speed control apparatus having functions equivalent to those of the embodiment shown in FIG. 1 can be realized by the use of a microcomputer, and another embodiment of the present invention using a microcomputer is shown in FIG. 5. In FIG. 5, portions the same as those shown in FIG. 1 are designated by the same reference numbers, and the explanation thereof will be omitted.

In a vehicle speed controlling apparatus 41, the computation for positioning the control rack 4 driven by the actuator 31 is executed in a central processing unit (CPU) 46 in accordance with a predetermined control program stored in a memory 45. This computation for positioning the control rack 4 is carried out on the basis of data produced by detectors which detect different aspects of the operation condition of the diesel engine 2. In the embodiment shown in FIG. 5, there are provided a coolant temperature detector 43 for generating coolant temperature data DW showing the temperature of the engine coolant and a fuel temperature detector 42 for generating fuel temperature data DF showing the fuel temperature, the vehicle speed detector 5, the acceleration detector 9 and the engine speed detector 10. The output data from these detectors are input though an input/output device (I/O) 44 to the CPU 46.

Figure 6:
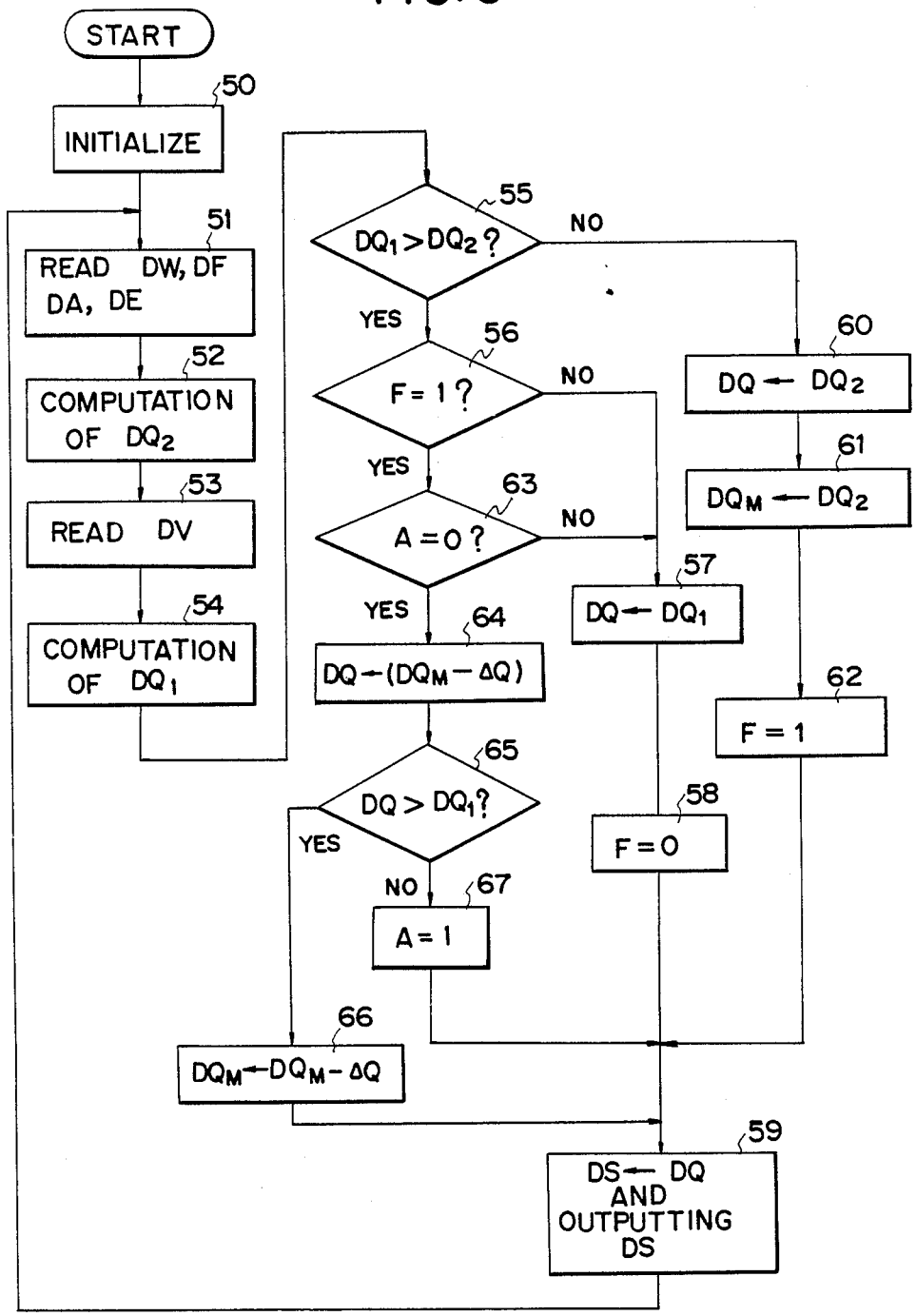
FIG. 6 is a flow chart of a program to be executed by the central processing unit of the vehicle speed controlling system of FIG. 5.

FIG. 6 shows a flow chart of the control program of the vehicle speed controlling apparatus 41, which is stored in the memory 45 and executed in the CPU 46. The control program will be explained. Initialization is made in step 50 after the start of execution of the program, and each of data DW, DF, DA and DE is read in in step 51 to carry out the computation of the second data $DQ_2$ showing the second amount of fuel supply $Q_2$ in accordance with the amount of operation of the accelerator pedal 7 in step 52. Then, vehicle speed data DV is read in in step 53 and the first data $DQ_1$ showing the first amount of fuel supply $Q_1$ is computed in step 54. After this, a comparison between the first data $DQ_1$ and the second data $DQ_2$ is made in step 55. Since the amount $Q_1$ is larger than the amount $Q_2$ when the vehicle speed is being automatically controlled the result of step 55 is YES, so that it is discriminated whether or not a flag F is "1" in step 56. As described hereinafter, the flag F is set when the result in step 55 becomes NO and is reset when the first data $DQ_1$ reaches at a stationary state after the first data $DQ_1$ becomes greater than the second data $DQ_2$.

In this case, since the flag F maintains the state as reset in the initialization step 50, the result in step 56 becomes NO and the first data $DQ_1$ is substituted for the content of control data DQ for controlling the position of the control rack 4 (step 57). Then, after the flag F is reset (step 58), control data DQ is substituted for the content of output data DS and data DS is output (step 59). After this, the procedure returns to step 51. As a result, the actuator 31 is driven in accordance with data DS and the position of the control rack 4 is controlled so as to maintain the vehicle speed at a desired target vehicle speed. The operation for setting the target vehicle speed and the computation for maintaining the vehicle speed at a desired target vehicle speed are carried out in step 54.

When the amount of duel supply $Q_2$ becomes greater than or equal to the amount of fuel supply $Q_1$, because of a large depression of the accelerator pedal 7 at the time the vehicle speed is being automatically controlled, the result in step 55 becomes NO. As a result, the step 60 is executed and the second data $DQ_2$ is substituted for the content of control data DQ. After this, step 61 is executed to substitute the second data $DQ_2$ for the content of data $DQ_M$, the flag F is set (step 62), and then step 59 is executed to produce output data DS showing the control data DQ. Thus, the vehicle speed is controlled in accordance with the degree of depression of the accelerator pedal 7 when the second amount of fuel supply $Q_2$ is equal to or more than the first amount of fuel supply $Q_1$.

The result in step 55 becomes YES when the accelerator pedal 7 is released during the state described above, and the result in step 56 also becomes YES. Consequently, it is discriminated whether or not the flag A is "0" in step 63. As described hereinafter in more detail, the flag A is set to "1" when the control data DQ is gradually decreased from data $DQ_M$ and data $DQ_m$ becomes equal to or less than the first data $DQ_1$.

In this case, since the flag A is reset by the initialization, the result in step 63 becomes YES, and $DQ_M$-$\Delta Q$ is substituted for the content of data DQ (step 64), where $\Delta Q$ is a predetermined value. In step 65, it is deiscriminated whether control data DQ is more than the first data $DQ_1$ at that time. When the result in step 65 is YES, step 66 is executed to substitute $DQ_M$-$\Delta Q$ for the content of $DQ_M$. Then, output data DS showing the value of Q obtained in step 64 is output (step 59) and the program procedure returns to step 51.

When control data DQ is gradually decreased by the repetitive execution of the program and control data DQ becomes equal to or less than the first data $DQ_1$, the result in step 65 becomes NO and the flag A is set to become "1". Therefore, in the following program cycle, the result in step 63 becomes NO and the first data $DQ_1$ is substituted for the content of the control data DQ. After this, the vehicle speed in controlled in accordance with the first data $DQ_1$. In addition since the flag F is reset in step 58 after the execution of step 57, the result in step 56 becomes NO in the following program cycle, so that step 64 is not executed.

As a result, even if the acceleration pedal 7 is suddenly released for carrying out automatic vehicle speed control again, the amount Q is gradually changed from $Q_2$ just before the acceleration pedal 7 is released to $Q_1$, which is the value required for automatically controlling the vehicle speed at the desired speed so that sudden deceleration of vehicle speed can be effectively prevented.

What is claimed is:

1. A vehicle speed control apparatus for a vehicle powered by an internal combustion engine, said apparatus comprising:

detecting means for producing a vehicle speed signal indicating an actual speed of the vehicle at each instant;

first calculating means responsive to at least the vehicle speed signal for calculating a first data indicating a first amount of fuel supply required for maintaining the vehicle spped at a desired value;

second calculating means responsive to operation of an accelerator pedal of the vehicle for calculating a second data indicating a second amount of fuel supply required for controlling the vehicle speed in accordance with tha amount of operation of the accelerator pedal;

comparing means for comparing the first amount of fuel supply indicated by the first data with the second amount of fuel supply indicated by the second data;

storing means responsive to an output of said comparing means for storing the data corresponding to the second data just before the second amount of fuel supply becomes lower than the first amount of fuel supply;

processing means responsive to said comparing means for producing a provisional data whose magnitude is reduced from the value of a stored data stored in said storing means to that of the first data at a prescribed rate when the second amount of fuel supply has become lower than the first amount of fuel supply;

switching means responsive to said comparing means for outputting the provisional data instead of the first data only during when the value of the provisional data is decreasing to that of the first data;

selecting means responsive to the second data and an output from said switching means for selecting the larger of the second data and the output from said switching means as a control data; and actuating means responsive to the control data for adjusting a fuel supply member for regulating the speed of the internal combustion engine.

2. An apparatus as claimed in claim 1, wherein said first calculating means has a memory means for storing data concerning a desired set vehicle speed in response to a set signal applied from outside, and means responsive to data stored in said memory means and said vehicle speed signal for calculating the amount of fuel supply necessary for maintaining the vehicle speed at said set vehicle speed.

3. An apparatus as claimed in claim 1, wherein said first calculating means has a memory for storing data concerning the vehicle speed signal at a desired time in response to a signal provided from outside a computing means responsive to data stored in said memory and the vehicle speed signal for computing the amount of fuel supply necessary for maintaining the vehicle speed at the set vehicle speed, and means for cutting off the output of the computing means when the operation of the vehicle assumes a predetermined state.

4. An apparatus as claimed in claim 1, further comprising means for obtaining an engine speed data representing the speed of the engine, and means for obtainig an acceleration data representing the amount of operation of the accelerator pedal, wherein said second calculating means operates in response to the acceleration data and the engine speed data.

5. An apparatus as claimed in claim 1, wherein said switching means includes a timer which is triggered to measure a predetermined period in response to the output of said comparing means when the value of the second data goes below the value of the first data, wherein said switching means is controlled to provide the data from said data processing means for the predetermined period.

6. An apparatus as claimed in claim 1, wherein said storing means has a memory to which the second data is applied in response to the output of said comparing means when the value of the second data is greater than the value of the first data and a pulse generator which produces clock pulses during the predetermined period in response to the output of said timer, the clock pulses being supplied to the memory as read-in clock pulses.

7. A vehicle speed control apparatus for a vehicle powered by an internal combustion engine comprising:

vehicle speed detecting means for producing a vehicle speed signal indicating an actual speed of the vehicle;

acceleration detecting means for producing an accelerator position signal indicating an actual position of an accelerator pedal of the vehicle;

a processing unit, including a memory, responsive to at least the vehicle speed signal and the accelerator position signal, for executing a program to regulate the speed of the internal combustion engine for obtaining a smooth transition when changing from a manually controlled driving operation to an automatically controlled driving operation, said program including:

a first calculating step responsive to at least the vehicle speed signal for calculating an automatically controlled set value indicating a first amount of fuel supply required for maintaining the vehicle speed at a desired speed;

a second calculating step responsive to at least the accelerator position signal for calculating a manually controlled set value indicating a second amount of fuel supply required for maintaining the vehicle speed in accordance with at least the position of the accelerator pedal;

a comparing step for comparing said automatically controlled set value with said manually controlled set value;

a storing step for storing the manually controlled set value at that time as a stored data when the manually controlled set value is not less than the automatically controlled set value;

a discriminating step for discriminating whether or not the manually controlled set value is less than the automatically controlled set value;

a step responsive to said discriminating step for reducing the value of the stored data by a prescribed magnitude when the manually controlled set value is less than the automatically controlled set value; and a step for outputting said stored data as a control data for regulating the speed of the internal combustion engine;

these steps being repeatedly executed till the value of the stored data becomes less than the automatically controlled set value.

* * * * *

UNITED STATES PATENT AND TRADEMARK OFFICE
CERTIFICATE OF CORRECTION

PATENT NO. : 4,852,011
DATED : July 25, 1989
INVENTOR(S) : Masahito Ueno

It is certified that error appears in the above-identified patent and that said Letters Patent is hereby corrected as shown below:

Title page, item [73] Assignee:   "Alps Electric Co., Ltd."
 should read -- Diesel Kiki Co., Ltd. --

Col. 1 Line 64
  "," comma after "pedal" should be deleted.

Col. 2 Line 53
  "firt" should read -- first --

Col. 4 Line 63
  "MD" should read -- DM --

Col. 5 Line 22
  "DQ1" should read -- $DQ_1$ --

Col. 5 Line 23 insert -- , -- comma after "contact"

Col. 5 Line 49
  "les" should read -- less --

Col. 8 Line 58
  "deiscriminated" should read -- discriminated --

Col. 9 Line 26 - Claim 1
  "spped" should read -- speed --

UNITED STATES PATENT AND TRADEMARK OFFICE
CERTIFICATE OF CORRECTION

PATENT NO. : 4,852,011

DATED : July 25, 1989

INVENTOR(S) : Masahito Ueno

It is certified that error appears in the above-identified patent and that said Letters Patent is hereby corrected as shown below:

Col. 10 Line 24 - Claim 5
 the second occurrence of "data" should be deleted.

Signed and Sealed this

Twenty-first Day of August, 1990

*Attest:*

HARRY F. MANBECK, JR.

*Attesting Officer*      *Commissioner of Patents and Trademarks*